United States Patent
Moore et al.

(10) Patent No.: US 9,014,347 B2
(45) Date of Patent: *Apr. 21, 2015

(54) VOICE PRINT TAGGING OF INTERACTIVE VOICE RESPONSE SESSIONS

(71) Applicant: International Business Machines Corporation, Armonk, NY (US)

(72) Inventors: Victor S. Moore, Lake City, FL (US); David Nahamoo, Great Neck, NY (US); Wendi L. Nusbickel, Boca Raton, FL (US); Christopher J. Vavra, Danville, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/059,844

(22) Filed: Oct. 22, 2013

(65) Prior Publication Data

US 2014/0270113 A1    Sep. 18, 2014

Related U.S. Application Data

(63) Continuation of application No. 13/833,917, filed on Mar. 15, 2013.

(51) Int. Cl.
*H04M 1/64* (2006.01)
*H04M 3/493* (2006.01)
*H04M 3/38* (2006.01)

(52) U.S. Cl.
CPC .............. *H04M 3/493* (2013.01); *H04M 3/385* (2013.01)

(58) Field of Classification Search
USPC ..................................................... 379/88.02
See application file for complete search history.

(56) References Cited

U.S. PATENT DOCUMENTS

| | | | |
|---|---|---|---|
| 6,327,345 B1 * | 12/2001 | Jordan | 379/88.02 |
| 6,654,447 B1 | 11/2003 | Dewan | |
| 6,941,553 B2 * | 9/2005 | Eisler et al. | 718/1 |
| 7,216,351 B1 * | 5/2007 | Maes | 719/328 |
| 7,260,537 B2 | 8/2007 | Creamer et al. | |
| 7,817,786 B2 * | 10/2010 | Lee et al. | 379/88.23 |
| 8,139,754 B2 | 3/2012 | Aghara et al. | |
| 8,175,651 B2 * | 5/2012 | Rios et al. | 455/566 |
| 8,180,646 B2 | 5/2012 | Jaiswal et al. | |
| 8,296,147 B2 | 10/2012 | Sharma | |
| 8,340,257 B1 * | 12/2012 | Paczkowski et al. | 379/93.17 |
| 2003/0112931 A1 | 6/2003 | Brown et al. | |
| 2003/0161464 A1 * | 8/2003 | Rodriguez et al. | 379/266.01 |
| 2003/0220095 A1 | 11/2003 | Engelhart | |
| 2004/0122941 A1 | 6/2004 | Creamer et al. | |
| 2004/0190688 A1 | 9/2004 | Timmins et al. | |
| 2008/0312925 A1 | 12/2008 | Jaiswal | |
| 2009/0141872 A1 | 6/2009 | Li et al. | |
| 2010/0158207 A1 | 6/2010 | Dhawan et al. | |
| 2012/0084087 A1 | 4/2012 | Yang et al. | |

* cited by examiner

*Primary Examiner* — Simon Sing
(74) *Attorney, Agent, or Firm* — Steven M. Greenberg, Esq.; CRGO Law

(57) ABSTRACT

Embodiments of the invention provide a method, system and computer program product for voice print tagging for interactive voice response (IVR) session management. In an embodiment of the invention, a method of voiceprint tagging for IVR session management is provided. The method includes establishing an IVR session for a caller from over a network and presenting a portion of the IVR session to the caller over the network. The method also includes storing a voiceprint tag in memory associating a voiceprint of the caller with a portion of the IVR session. Finally, the method includes responding to a premature termination of the IVR session by re-establishing the prematurely terminated IVR session with the caller at the portion of the IVR session indicated by the voiceprint tag of the caller.

5 Claims, 2 Drawing Sheets

VOICE PRINT TAGGING OF INTERACTIVE VOICE RESPONSE SESSIONS

CROSS-REFERENCE TO RELATED APPLICATIONS

This application is a Continuation of U.S. application Ser. No. 13/833,917, filed Mar. 15, 2013, currently pending, the entirety of which is incorporated herein by reference.

BACKGROUND OF THE INVENTION

1. Field of the Invention

The present invention relates to interactive voice response (IVR) system session management and more particularly to IVR session interruption and resumption methodologies.

2. Description of the Related Art

Biometrics (or biometric authentication) refers to the identification of humans by characteristics or traits of humans. Biometrics has been used in the field of computer science as a form of identification and access control. Biometrics also has been used to identify individuals in groups under surveillance. Biometric identifiers are the distinctive, measurable characteristics used to label and describe individuals and are often categorized as physiological versus behavioral characteristics. As a physiological indicator, the human voice is unique because of the shape of the human vocal cavity and the way the mouth of a humans moves when speaking. Accordingly, in the field of biometrics, a voiceprint can act as tangible representation of the human voice of an individual.

In this regard, a voiceprint is a set of measurable characteristics of a human voice that uniquely identifies an individual. These characteristics, which are based on the physical configuration of a speaker's mouth and throat, can be expressed as a mathematical formula. The term voiceprint, then, applies to a vocal sample recorded by a voiceprint system for that purpose, the derived mathematical formula, and its graphical representation. To enroll in a voiceprint system, a subject generally repeats one or more words or phrases presented by the voiceprint system, or the voiceprint system simply accepts from a subject an extended sample of speech so that the computer can identify the subject no matter the words spoken by the subject.

In the past, voiceprints have been used to authenticate an individual seeking access to a computer program. Additionally, voiceprints have been used within interactive voice response (IVR) systems to route inbound telephone calls within a call center. In this regard, voiceprints have been incorporated into the routing infrastructure of IVR so as to route calls from high priority individuals to faster responding call queues while other calls are routed to general response call queues. IVR systems also have incorporated voiceprints to locate telecommunications logs relating to a telephone call placed by a particular caller.

Yet, IVR systems favor other less personal forms of data to effectively route calls and manage IVR systems. In particular, IVR systems favor device dependent data in order to route calls—namely caller identification associated with automatic number identification (ANI). Notwithstanding, device dependent data cannot account for the caller who utilizes multiple different communications devices to access an IVR system. Rather, device dependent data can only process calls in an IVR system according to the device utilized by the caller rather than the identity of the caller him or herself.

BRIEF SUMMARY OF THE INVENTION

Embodiments of the present invention address deficiencies of the art in respect to IVR system session management and provide a novel and non-obvious method, system and computer program product for voice print tagging for IVR session management. In an embodiment of the invention, a method of voiceprint tagging for IVR session management is provided. The method includes establishing an IVR session for a caller from over a network and presenting a portion of the IVR session to the caller over the network. The method also includes storing a voiceprint tag in memory associating a voiceprint of the caller with a portion of the IVR session. Finally, the method includes responding to a premature termination of the IVR session by re-establishing the prematurely terminated IVR session with the caller at the portion of the IVR session indicated by the voiceprint tag of the caller.

In one aspect of the embodiment, the portion of the IVR session is an activity of the IVR session last completed by the caller. In another aspect of the embodiment, the portion of the IVR session is a prompt of an activity of the IVR session last presented to the caller. In yet another aspect of the embodiment, the portion of the IVR session is a waypoint of the IVR session last reached by the caller.

Of note, in even yet another aspect of the embodiment, the method additionally includes authenticating the caller prior to presenting the IVR session to the caller, acquiring a voiceprint of the caller at a portion of the IVR session, comparing the acquired voiceprint to the voiceprint in the stored voiceprint tag, and in response to a failure to match the acquired voiceprint to the voiceprint in the stored voiceprint tag, re-authenticating the caller.

In another embodiment of the invention, an IVR data processing system can be configured for voiceprint tagging for IVR session management. The system can include a host gateway configured to receive calls from different callers over a communications network. The system also can include an IVR system executing in memory of a computing system and establishing IVR sessions with the different callers. Finally, the system can include a voiceprint tagging module coupled to the IVR system. The module can include program code enabled to store a voiceprint tag in memory associating a voiceprint of a caller interacting with the IVR system in a corresponding IVR session, with a portion of the IVR session, and to respond to a premature termination of the corresponding IVR session, by re-establishing the prematurely terminated IVR session with the caller at the portion of the corresponding IVR session indicated by the voiceprint tag of the caller.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for voiceprint tagging for IVR session management. In accordance with an embodiment of the invention, different IVR sessions with different callers can be associated with correspondingly different voiceprints of the different callers. Thereafter, upon a premature termination of one of the IVR sessions with a caller before the IVR session has completed, a portion of the terminated IVR session associated with the termination can be tagged with a voiceprint of the caller. Subsequently, the terminated IVR session can be resumed for the caller at a portion of the IVR session tagged with the voiceprint of the caller.

Figure 1:
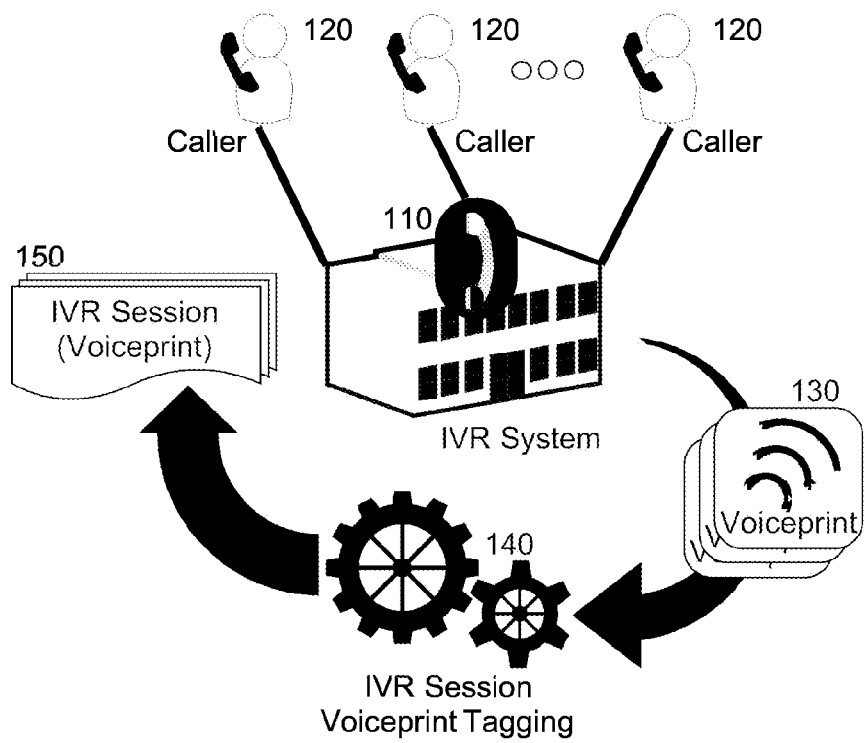
FIG. 1 is a pictorial illustration of a process for voiceprint tagging for IVR session management.

In further illustration, FIG. 1 pictorially illustrates a process for voiceprint tagging for IVR session management. As shown in FIG. 1, an IVR system 110 can manage different IVR sessions 150 with different callers 120. Each IVR session 150 can include a set of activities driven by voice prompts and responses to those prompts exchanged over a telephonic linkage between the callers 120 and the IVR system 110. IVR session voiceprint tagging logic 140 can receive voiceprints 130 for each of the callers 120 and can store in memory an association with each voiceprint 130 and a corresponding caller 120 and IVR session 150. Further, not only can each voiceprint 130 be stored in memory in association with a corresponding caller 120 and IVR session 150, but also each voiceprint 130 be stored in memory in association with a corresponding caller 120 and particular portion of an IVR session 150 such as a particular activity or each a particular prompt of an activity of the IVR session 150.

Thereafter, in the event that an IVR session 150 prematurely terminates for a corresponding caller 120 before completion of all activities of the IVR session 150, upon reconnecting the corresponding caller 120 with the IVR system 110, a voiceprint of the corresponding caller 120 can be used to locate not only the prematurely terminated IVR session 150, but also the portion of the IVR session 150 last associated with a voiceprint 130 of the corresponding caller can be identified and the prematurely terminated IVR session 150 can be resumed from that portion. Literally, the corresponding caller 120 can resume the prematurely terminated IVR session 150 where the corresponding caller 120 last left off as indicated by the voiceprint 130 of the corresponding caller 120.

Figure 2:
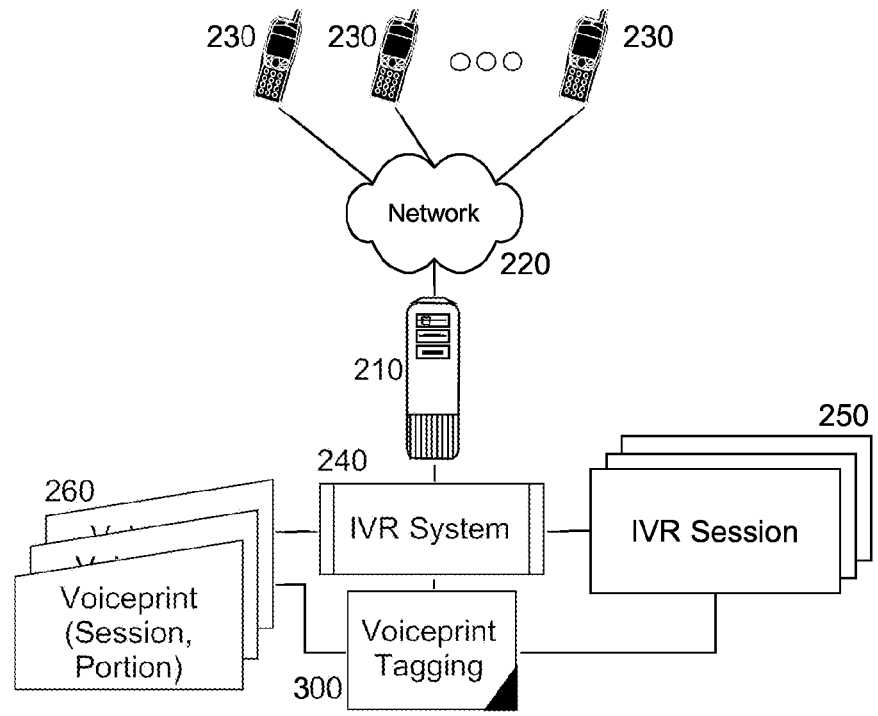
FIG. 2 is a schematic illustration of an IVR data processing system configured for voiceprint tagging for IVR session management; and, FIGS. 3A and 3B, taken together, are a flow chart illustrating a process for voiceprint tagging for IVR session management.

The process described in connection with FIG. 1 can be implemented in an IVR data processing system. In further illustration, FIG. 2 schematically shows an IVR data processing system configured for voiceprint tagging for IVR session management. The system can include a host gateway 210 communicatively linked to different communications devices 230 over network 220. The host gateway 210 can support the operation of an IVR system 240. The IVR system 240 in turn can establish and maintain different IVR sessions 250 for respectively different callers using respectively different ones of the communications devices 230.

Of note, a voiceprint tagging module 300 can be operationally integrated with the IVR system 240 and can execute in memory of the host gateway 210 or other computing device communicatively coupled to the host gateway 210. The voiceprint tagging module 300 can include program code enabled upon execution to collect generate different voiceprint tags 260. Each of the voiceprint tags 260 can include a voiceprint for a caller and an association with a portion of a corresponding one of the IVR sessions 250 established for the caller.

The portion of the corresponding one of the IVR sessions 250 can be a specified activity of the corresponding one of the IVR sessions 250, or a specified prompt for an activity of the corresponding one of the IVR sessions 250. Further, each of the voiceprint tags 260 for each of the callers can be updated periodically as the callers progress from prompt to prompt and activity to activity of corresponding ones of the IVR sessions 250 to reflect either a most recent activity or prompt processed for a corresponding one of the callers. Optionally, each one of the IVR sessions 250 can include different waypoints—predetermined portions of the IVR session 250—and a voiceprint tag 260 can be updated with a portion of an IVR session 250 for a caller reflective of a last traversed waypoint of the IVR session 250.

The module 300 further can include program code enabled upon execution to match a voiceprint for a caller to one of the voiceprint tags 260. Based upon a matching of a voiceprint of the caller to one of the voiceprint tags 260, an already established but prematurely terminated one of the IVR sessions 250 can be resumed for the caller based only upon the collection of a voiceprint for the caller. Further, the prematurely terminated one of the IVR sessions 250 can be resumed at a portion of the prematurely terminated one of the IVR sessions 250 where the caller had last interacted, or alternatively, at a portion determined to be most suitable for resuming a prematurely terminated one of the IVR sessions 250.

Figure 3A:
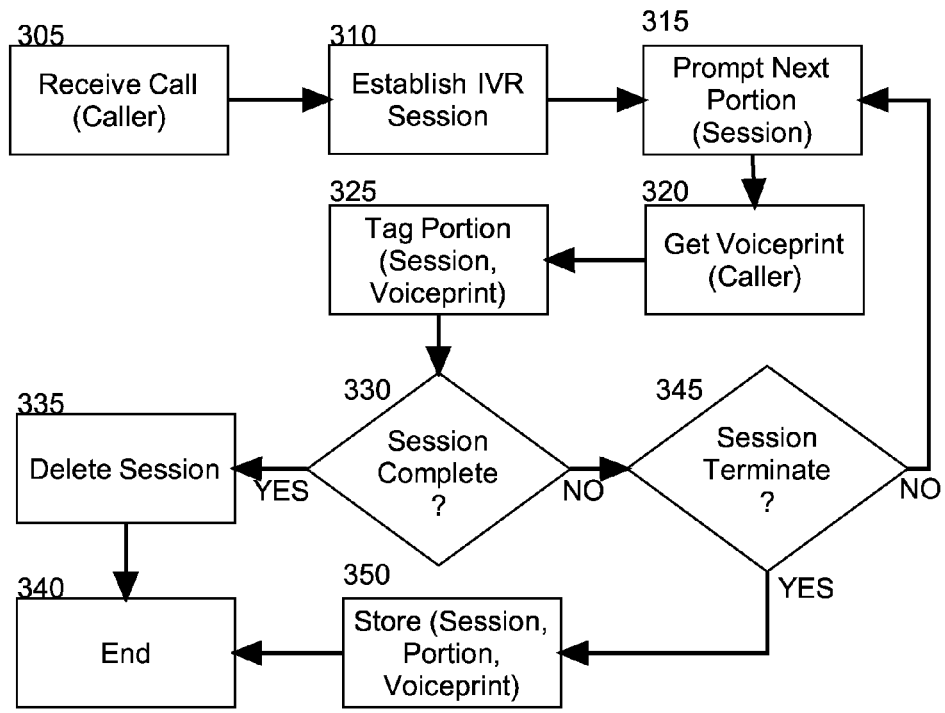
Figure 3B:
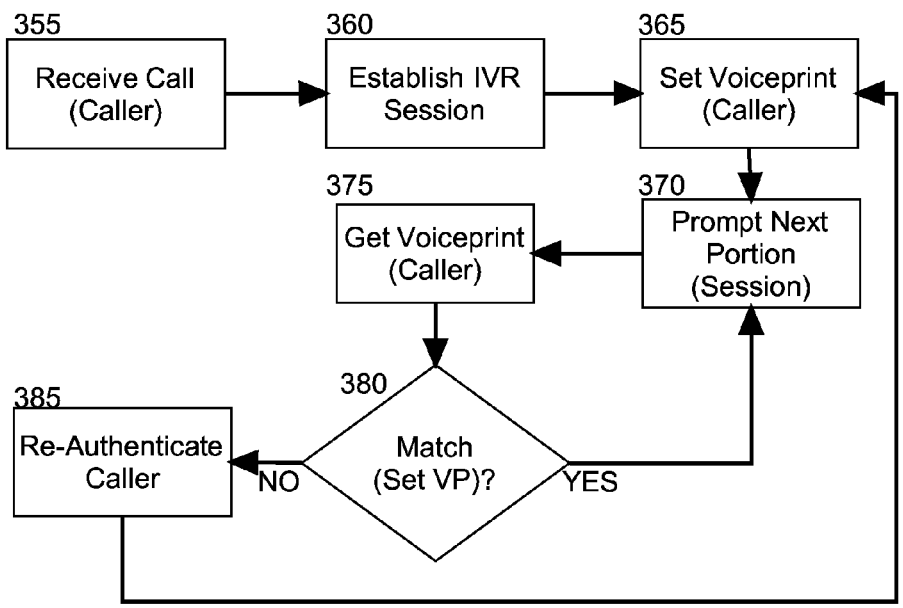

In even yet further FIGS. 3A and 3B, taken together, are a flow chart illustrating a process for voice print tagging for IVR session management. Beginning first with FIG. 3A at block 305, a call can be received in an IVR system by way of a host gateway from a caller using a communications device and in block 310 an IVR session can be established as between the caller and the IVR system. In block 315, the caller can be prompted by the IVR system in accordance with an activity of a first portion of the IVR session. In block 320 a voiceprint can be collected for the caller and the first portion of the IVR session can be tagged with the voiceprint. In decision block 330 it can be determined if the IVR session has completed and no further activities remain. If so, in block 335 the IVR session can be deleted and the process can end in block 340. Otherwise, the process can continue through decision block 345.

In decision block 345, it can be determined whether or not the IVR session has prematurely terminated, for example, in consequence of a dropped phone call or unexpected interruption in communications. If not, the process can continue through block 315 with a prompt for a next portion of the IVR session being presented to the caller. However, in decision block 345 if it is determined that the IVR session has prematurely terminated, the voiceprint tag for the caller and the IVR session can be updated to indicate a last portion of the IVR session completed by the caller and the process can end in block 340. As such, upon the caller reconnecting with the IVR system, a voiceprint of the reconnected caller can be matched to the updated voiceprint tag and the IVR session can resume for the reconnected caller at the portion of the IVR session indicated by the voiceprint tag.

Turning now to FIG. 3B, the use of voiceprints also can provide an assurance to the IVR system that a caller interacting with the IVR session has not changed in the course of the IVR session—particularly where the information exchanged during the IVR session is sensitive and a higher degree of security required. In illustration, beginning in block 355, a call can be received from a caller into an IVR system by way of a host gateway and in block 360, an IVR session can be established for the caller subsequent to authentication of the caller. In block 365, a voiceprint can be acquired for the caller and stored in a voiceprint tag, and in block 370 a next portion of the IVR session can be presented to the caller. In block 375 another voiceprint can be acquired for the caller and compared to the previously collected voiceprint in the voiceprint tag.

In decision block 380, it can be determined whether or not the voiceprints match. If so, the IVR session can continue in block 370 with the presentation of a next portion of the IVR session. However, in decision block 380 if the voiceprints do not match, in block 385 the caller can be re-authenticated and the voiceprint tag can updated with the voiceprint of the caller in block 365. Only then can the IVR session be permitted to resume with the presentation of a next portion of the IVR session in block 370. In this way, the IVR session can be presented only so long as the caller interacting with the IVR session has been authenticated and only for as long as the authenticated caller continues to interact with the IVR session irrespective of the communications device used by the caller to interact with the IVR session.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of voiceprint tagging for interactive voice response (IVR) session management, the method comprising:
   establishing an IVR session for a caller from over a network;
   presenting a portion of the IVR session to the caller over the network;
   storing a voiceprint tag in memory associating a voiceprint of the caller with a portion of the IVR session; and,
   responsive to a premature termination of the IVR session, re-establishing the prematurely terminated IVR session with the caller at the portion of the IVR session indicated by the voiceprint tag of the caller.

2. The method of claim 1, wherein the portion of the IVR session is an activity of the IVR session last completed by the caller.

3. The method of claim 1, wherein the portion of the IVR session is a prompt of an activity of the IVR session last presented to the caller.

4. The method of claim 1, wherein the portion of the IVR session is a waypoint of the IVR session last reached by the caller.

5. The method of claim 1, further comprising:
   authenticating the caller prior to presenting the IVR session to the caller;
   acquiring a voiceprint of the caller at a portion of the IVR session;
   comparing the acquired voiceprint to the voiceprint in the stored voiceprint tag; and,
   responsive to a failure to match the acquired voiceprint to the voiceprint in the stored voiceprint tag, re-authenticating the caller.

* * * * *